United States Patent [19]

Brenig

[11] 3,919,633

[45] Nov. 11, 1975

[54] HIGH VOLTAGE MEASURING DEVICE
[75] Inventor: Theodore Brenig, Lynchburg, Va.
[73] Assignee: General Electric Company, Lynchburg, Va.
[22] Filed: Nov. 26, 1974
[21] Appl. No.: 527,500

Related U.S. Application Data
[63] Continuation-in-part of Ser. No. 458,524, April 8, 1974, abandoned.

[52] U.S. Cl. .................. 324/126; 317/12 B; 323/93
[51] Int. Cl.[2] ..................... G01R 19/00; H02H 7/16
[58] Field of Search ......... 324/126; 317/12 R, 12 B; 323/93

[56]         References Cited
     FOREIGN PATENTS OR APPLICATIONS
1,083,424   6/1960   Germany ............................ 324/126
1,055,120   4/1959   Germany ............................ 324/126

Primary Examiner—Alfred E. Smith
Assistant Examiner—Ernest F. Karlsen

[57] ABSTRACT

High voltage power lines are provided with a coupling capacitor for connecting carrier systems to the power line and for providing a voltage divider to indicate the line voltage. The coupling capacitor usually comprises a series of individual capacitors that provide the necessary voltage rating. A frequency and load independent measuring device comprises first and second input terminals adapted to be connected across one of the capacitors of the series. A measuring capacitor has one end connected to the first input terminal. A load impedance of any finite value is connected between the other end of the capacitor and the second input terminal. Means are provided for measuring the voltages between the second input terminal and each end of the measuring capacitor, and subtracting the differences of selected ratios of the measured voltages to provide an accurate measurement of the voltage of the high voltage line.

4 Claims, 5 Drawing Figures $$X1 = \frac{1}{j\omega C1}$$

$$X2 = \frac{1}{j\omega C2}$$

$$ZM = \frac{1}{j\omega CM}$$

HIGH VOLTAGE MEASURING DEVICE

CROSS REFERENCE TO RELATED APPLICATION

This application is a continuation-in-part of my pending application entitled "High Voltage Measuring Device" filed Apr. 8, 1974, Ser. No. 458,524, now abandoned.

BACKGROUND OF THE INVENTION

My invention relates to a high voltage measuring device, and particularly to a high voltage measuring device for providing an accurate measurement of high voltage, alternating current.

Protective devices for 60 Hz, high voltage power lines require an accurate measurement of the power line voltage. The protective devices should be operated when conditions require such operation to protect the line and equipment, but should not be erroneously or falsely operated and thereby interrupt primary electrical power unnecessarily.

Accordingly, a primary object of my invention is to provide a new high voltage measuring device that is particularly useful on 60 Hz electrical power lines.

Voltage measuring devices for electrical power lines have been previously provided. Typically, such devices comprise a coupling capacitor that has a series of individual capacitors which provide the necessary voltage rating, and that is connected between the power line and ground. A network comprising a tuning inductor and a load (or burden) transformer is connected across one of the individual capacitors, usually the capacitor in the series nearest or connected to ground. Control and indicating circuits forming the load are connected to the secondary of the transformer. While such devices have performed well, they are sensitive to line frequency and to the load.

Accordingly, another object of my invention is to provide a new and improved alternating current, high voltage measuring device that provides a voltage measurement that is completely independent of the frequency of the alternating current and of the load of the measuring circuit.

SUMMARY OF THE INVENTION

Briefly, these and other objects are achieved in accordance with my invention by a measuring device having first and second input terminals which are adapted to be connected across one or more of the series of capacitors forming a high voltage divider that is to be connected to the high voltage line. A measuring capacitor of selected magnitude has one end connected to the first input terminal. A load or impedance, which may be the primary winding of an output transformer, of any finite magnitude is connected between the other end of the measuring capacitor and the second input terminal. Means are connected between the second input terminal and the ends of the measuring capacitor for measuring the relative voltage of the ends of the measuring capacitor with respect to the second terminal. A predetermined ratio of each of these measured voltages is taken. The ratios of the voltages are subtracted to provide an accurate, frequency and load independent measurement of the high voltage on the power line.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF PREFERRED EMBODIMENTS

Figure 1:
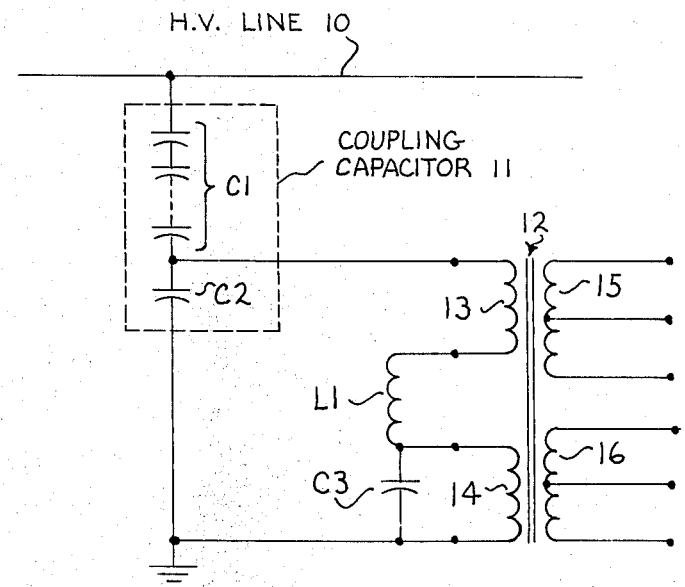
FIG. 1 shows an electrical circuit diagram of a prior art, high voltage measuring device.

Before describing my invention, I will describe a prior art, high voltage measuring device. In FIG. 1, I have shown such a device as used with a high voltage transmission line 10. A coupling capacitor 11, indicated in the dashed line rectangle, is connected to the high voltage line 10 and a point of reference potential, such as ground. Generally, the coupling capacitor 11 comprises a series of generally similar individual capacitors which provide the necessary voltage rating determined by the line 10. The capacitors nearest the line 10 are indicated by the legend C1, and the capacitor nearest ground is indicated by the legend C2. Since the capacitor C2 is nearest ground, it is the safest and most convenient for measuring the line voltage. If the capacitors in the series are similar, the line voltage is approximately equal to the measured voltage across the capacitor C2 multiplied by the number of capacitors in the series. Terminals from the capacitor C2 are connected to a load transformer 12 which provides the desired isolation. I have shown the transformer 12 as comprising two primary windings 13, 14, each of which has one end connected to a respective side of the capacitor C2. A tuning inductor L1 is used to connect the other ends of the primary windings 13, 14 together and is used to tune out the capacity present in the circuit. A bypass capacitor C3 may also be connected between the lower end of the inductor L1 and ground. The transformer 12 may be provided with one or more secondary windings 15, 16 which in a typical application are used to control relays or other circuit devices which respond to an undervoltage or an overvoltage to cause appropriate switching or interruption of the high voltage line 10.

Figure 2:
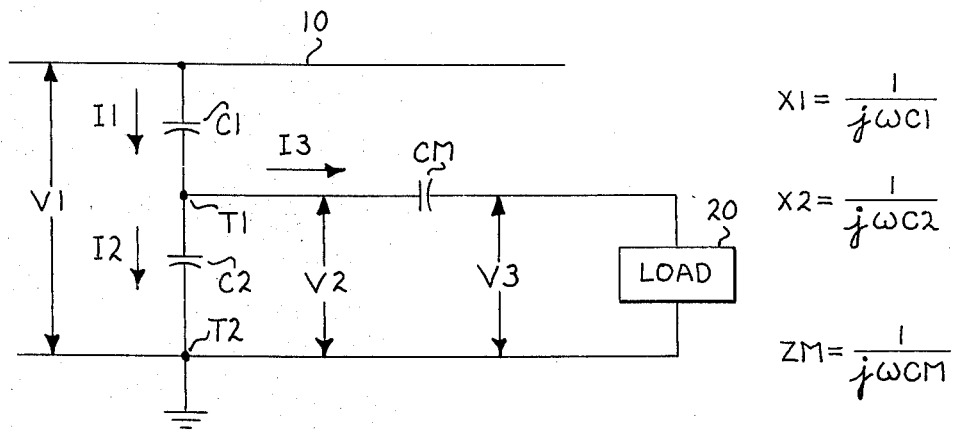
FIG. 2 shows an electrical circuit diagram of a high voltage measuring device in accordance with my invention.

An examination of the known circuit of FIG. 1 will show that the voltage provided at the secondary windings 15, 16 is frequency and load dependent. While the frequency on the line 10 may not vary appreciably in some applications, it is desirable that the voltage indication provided in such instances be as stable as possible and as independent of frequency sensitive elements as possible. And clearly the voltages at the secondary windings 15, 16 and at the primary windings 13, 14 depend on the actual impedance or load connected to the secondary windings 15, 16. Accordingly, I have invented a frequency load independent measuring device as shown in FIG. 2. While other applications are possible, I have shown my measuring device being used in the same application as shown in FIG. 1, namely with the high voltage line 10 and the coupling capacitor having all but one of the capacitors indicated by the legend C1 and the last capacitor indicated by the legend C2. The measuring circuit in accordance with my invention comprises first and second terminals T1, T2 which are adapted to be connected across any one or more of the individual capacitors in the series, but preferably the capacitor C2 nearest ground. A measuring capacitor CM has one end connected to the first terminal T1, and has the other end connected through load 20 to the second terminal T2. The load 20 may be of any finite magnitude and may be of any type, namely resistive, inductive, or capacitive, or a combination of these. Generally, such as in FIG. 1, the load 20 would be the transformer 12 and the load on the secondary windings 15, 16. I have also indicated certain voltages and currents in FIG. 2, namely a voltage V1 between the terminal T2 and the line 10, a voltage V2 between the terminal T2 and one side of the measuring capacitor CM, a voltage V3 between the terminal T2 and the other side of the measuring capacitor, a current I1 flowing through the capacitor C1, a current I2 flowing through the capacitor C2, and a current I3 flowing through the measuring capacitor CM and the load 20. As will be shown mathematically below, if the voltages V2 and V3 are measured, if predetermined ratios of these voltages are taken, and if the ratios of these voltages are subtracted, the resultant difference is an accurate measurement of the voltage V1 between ground or some reference point and the line 10. And further, the measurement is frequency and load independent.

In order to show how this frequency and load independent measurement can be obtained, I have assumed that the capacitor CM is an unspecified type of impedance ZM, that the capacitor C1 has an impedance X1, and that the capacitor C2 has an impedance X2. With the circuit of FIG. 2, the following equations can be written:

$$I2 = \frac{V2}{X2} \qquad \text{Equation 1}$$

$$I3 = \frac{V2 - V3}{ZM} \qquad \text{Equation 2}$$

$$I1 = I2 + I3 \qquad \text{Equation 3}$$
$$V1 = I1 \cdot X1 + V2 \qquad \text{Equation 4}$$

Substituting equations 1 and 2 for I2 for I3 in equation 3, and substituting that result for I1 in equation 4, I obtain:

$$V1 = \left(\frac{V2}{X2} + \frac{V2 - V3}{ZM}\right) X1 + V2 \qquad \text{Equation 5}$$

Rearranging equation 5, I obtain:

$$V1 = V2\left(1 + \frac{X1}{X2} + \frac{X1}{ZM}\right) - V3 \left(\frac{X1}{ZM}\right) \qquad \text{Equation 6}$$

Since X1 and X2 by themselves are frequency dependent, equation 6 can only be made frequency independent by making ZM the same reactance as X1, namely capacitive. If this is done and capacity values are substituted in equation 6, I obtain:

$$V1 = V2\left(1 + \frac{C2}{C1} + \frac{CM}{C1}\right) - V3 \left(\frac{CM}{C1}\right) \qquad \text{Equation 7}$$

and this can be written as:

$$V1 = V2 \left(\frac{C1 + C2 + CM}{C1}\right) - V3 \left(\frac{CM}{C1}\right) \qquad \text{Equation 8}$$

In equation 8, it will be seen that the line voltage V1 is equal to the voltage V2 multiplied by a constant equal to the sum of the capacities C1, C2, and CM divided by the capacity C1, minus the voltage V3 multiplied by the capacity CM and divided by the capacity C1. Since the capacities are constant, the voltage V1 is independent of frequency and is independent of the load 20. However, as pointed out, only a capacitive device CM will provide a frequency independent measurement. If a resistor or an inductor is substituted for the capacitor CM or is used with the capacitor CM, then the voltage measurement will be frequency dependent. Hence, only the capacitor CM may be used. It should be noted that the measuring capacitor CM may be moved from its location shown in FIG. 2 and placed between the load 20 and the terminal T2. In such a case, the above relations still apply.

Figure 3:
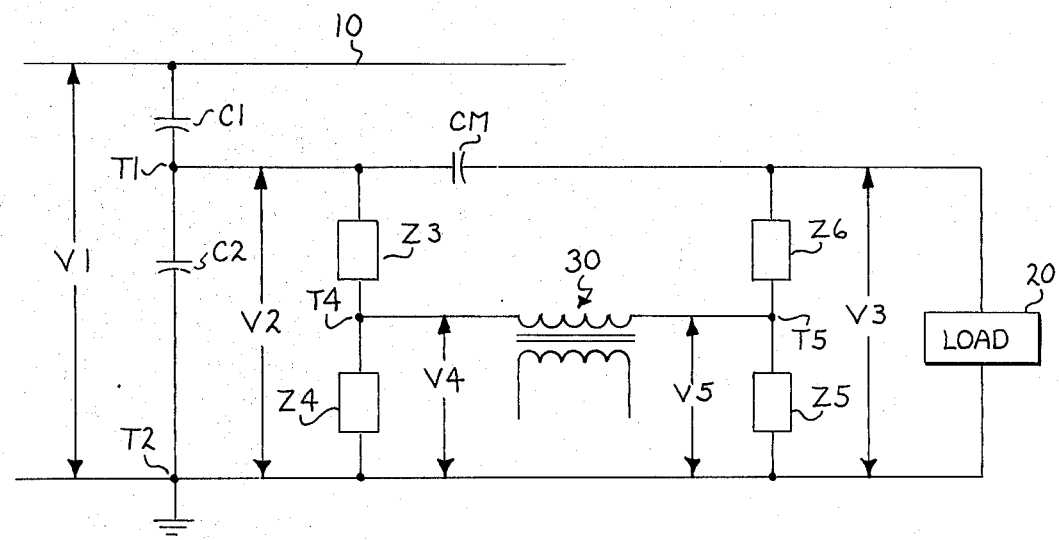
FIG. 3 shows an electrical circuit diagram of a high voltage measuring device which is in accordance with my invention, and which is provided with a circuit for deriving and indicating the measured voltage.

Persons skilled in the art will appreicate that the measured voltage V2 can be multiplied by the ratio $$\left(\frac{C1 + C2 + CM}{C1}\right)$$

and the measured voltage V3 can be multiplied by the ratio $$\left(\frac{CM}{C1}\right).$$

and the two products subtracted to obtain the true voltage V1. While such a computation can be obtained from measured voltages and mathematicl calculations, persons skilled in the art will also appreciate that an automatic indication of such a voltage would be preferable. Such an automatic indication could be obtained by suitable electronic circuits such as an operational amplifier having the two inputs connected to receive the voltages V2, V3 in the proper ratios and polarities. In FIG. 3, I show a preferred arrangement for providing an indication of the voltage V1. This arrangement comprises a bridge network having two impedances Z3, Z4 serially connected between one end of the capacitor CM and the terminal T2, and two impedances Z6, Z5 serially connected between the other end of the capacitor CM and the terminal T2. A terminal T4 is provided at the junction of the impedances Z3, Z4 and a terminal T5 is provided at the junction of the impedances Z6, Z5. A transformer 30 is connected between the terminals T4, T5 to measure the difference in the voltages V4 and V5 and, if desired, provide a voltage transformation. With respect to equation 8, the circuit of FIG. 3 should be arranged so that:

$$V1 = (V4 - V5) \cdot 1/K \quad \text{Equation 9}$$

In equation 9, $$V4 = K \cdot V2 \left( \frac{C1 + C2 + CM}{C1} \right) \text{ and } V5 = K \cdot V3 \left( \frac{CM}{C1} \right).$$

Figure 4:
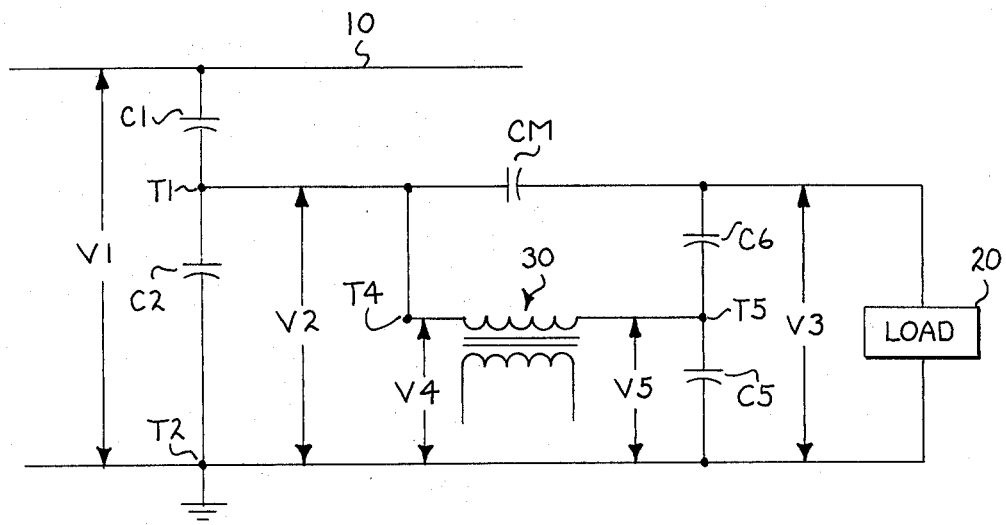
FIG. 4 shows an electrical circuit diagram of a high voltage measuring device which is in accordance with my invention, and which is provided with one preferred circuit for deriving and indicating the measured voltage.

In these equations, the factor K should be selected so that optimum circuit values can be obtained. Thus, the impedances Z3, Z4 can be selected to provide the voltage V4 in accordance with equation 9, and the impedances Z5, Z6 can be selected to provide the voltage V5 in accordance with equation 9. While resistors could be used for these impedances Z3, Z4, Z6, Z5, in view of the high voltages involved, such resistors would have to have high magnitudes in order to limit power dissipation. Such high magnitudes could cause accuracy problems, so that capacitors are preferable. And, it is also preferable that the impedance Z3 be zero and the impedance Z4 be infinite so that two capacitors can be eliminated. Such a circuit is shown in FIG. 4. In this circuit, the voltage V4 is equal to the voltage V2. In equation 9, $$V4 = K \cdot V2 \left( \frac{C1 + C2 + CM}{C1} \right).$$

In order for V4 to equal V2, K must be equal to $$\left( \frac{C1}{C1 + C2 + CM} \right).$$

If this term is inserted for K in the equation for V5, I obtain:

$$V5 = V3 \left( \frac{CM}{C1 + C2 + CM} \right) \quad \text{Equation 10}$$

With respect to FIG. 3, the following voltage and impedance relation exists:

$$\frac{V5}{V3} = \frac{Z5}{Z6 + Z5} \quad \text{Equation 11}$$

If equations 10 and 11 are combined, I obtain:

$$\frac{Z5}{Z6 + Z5} = \frac{CM}{C1 + C2 + CM} \quad \text{Equation 12}$$

Thus, the impedances Z5 and Z6 should be selected to satisfy equation 12. These impedances may be of any type, but I prefer that capacitors be used. If desired, inductors and/or resistors may also be connected in series with each of the capacitors C5, C6, as long as equation 12 is satisifed.

Figure 5:
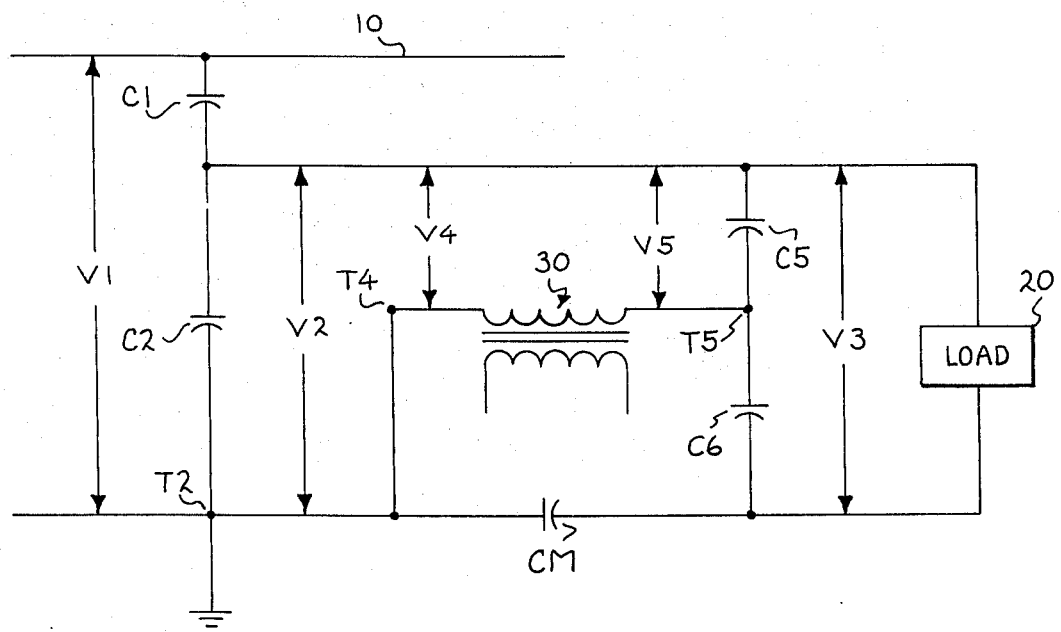
FIG. 5 shows an electrical circuit diagram of a high voltage measuring device which is in accordance with my invention, and which is provided with another preferred circuit for deriving and indicating the measured voltage.

While the circuit of FIG. 4 operates satisfactorily, it will be apparent that the primary winding of the transformer 30 is at a relatively high voltage. Accordingly suitable insulation between the primary and secondary windings should be provided for the transformer 30 to prevent this high voltage from breaking down the insulation and appearing at the secondary winding. In those situations where it is preferred that the primary winding of the transformer be at a relatively low potential, I have provided the circuit shown in FIG. 5. A comparison of FIG. 5 with FIG. 4 will show that the circuit of FIG. 5 has been reversed from top to bottom. Thus, the measuring capacitor CM has been placed in the lower line and connected to the terminal T2, and the capacitors C5, C6 have been interchanged. The terminal T4 of the primary winding of the transformer 30 has been connected to the terminal T2, and the other terminal of the primary winding of the transformer 30 has been connected to the terminal T5 as before. With these changes, the primary winding of the transformer 30 is at a relatively low potential, so that breakdown insulation requirements for the transformer 30 need not be so severe. Otherwise, the circuit of FIG. 5 operates in the same manner and with the same relationships as described in connection with the circuit of FIG. 4. With the terminal T2 connected to ground, the voltage at the terminal T5 relative to the terminal T2 can, if desired, be measured directly without the use of the transformer 30.

It will thus be seen that I have provided a new and improved circuit for giving a voltage measurement which is independent of frequency and which is independet of load magnitude. In addition, my circuit is relatively simple and requires only a capacitor, a load, and a measuring circuit. And, I have shown in FIGS. 3, 4, and 5 relatively simple circuits which provide such a measurement. If an absolute value of the line voltage V1 is desirable or necessary, the measured voltage may be multiplied by the ratio $$\left( \frac{C1 + C2 + CM}{C1} \right)$$

to give the absolute line voltage V1, taking into consideration of course any voltage transformation provided by the transformer 30. In summary, while my invention has been described with reference to a particular embodiment, it is to be understood that modifications may be made without departing from the spirit of my invention or from the scope of the claims.

What I claim as new and desire to secure by Letters Patent of the United States is:

1. In a high voltage system having a line, a first terminal, a first capacitor of magnitude C1 connected between said line and said first terminal, a second terminal, a second capacitor of magnitude C2 connected between said first terminal and said second terminal, an improved arrangement for measuring the voltage between said line and said second terminal comprising:
    a. a measuring capacitor of magnitude CM having a first end adapted to be connected to one of said terminals and having a second end;
    b. first means connected to said first end of said measuring capacitor and adapted to be connected to the other of said terminals for indicating a first voltage between said other terminal and said first end of said measuring capacitor as a function of the ratio $$\left( \frac{C1 + C2 + CM}{C1} \right);$$

c. second means connected to said second end of said measuring capacitor and adapted to be connected to said other terminal for indicating a second voltage between said other terminal and said second end of said measuring capacitor as a function of the ratio $$\left(\frac{CM}{C1}\right);$$

d. and third means connected to said first and second means for indicating the difference between said first and second voltages.

2. In a high voltage system having a line, a first terminal, a first capacitor of magnitude C1 connected between said line and said first terminal, a second terminal, a second capacitor of magnitude C2 connected between said first terminal and said second terminal, an improved arrangement for measuring the voltage between said line and said second terminal comprising:

a. a measuring capacitor of magnitude CM having a first end adapted to be connected to one of said terminals and having a second end;
b. a measuring terminal;
c. a first impedance of magnitude Z1;
d. a second impedance of magnitude Z2;
e. said impedances and said capacitors having the following magnitude relation:

$$\frac{Z2}{Z1 + Z2} = \frac{CM}{C1 + C2 + CM},$$

f. means connecting said first impedance between said second end of said measuring capacitor and said measuring terminal;
g. means connecting said second impedance between said measuring terminal and the other of said terminals;
h. and means connected between said one terminal and said measuring terminal for deriving the voltage therebetween.

3. The improved arrangement of claim 2 wherein said first and second impedances each comprise a capacitor.

4. The improved arrangement of claim 2 wherein said first and second impedances each consist of only a capacitor.

* * * * *